(12) United States Patent
Fukuda et al.

(10) Patent No.: US 11,381,140 B2
(45) Date of Patent: Jul. 5, 2022

(54) MOTOR

(71) Applicant: FANUC CORPORATION, Yamanashi (JP)

(72) Inventors: Masao Fukuda, Yamanashi-ken (JP); Nobuyuki Ootake, Yamanashi-ken (JP)

(73) Assignee: FANUC CORPORATION, Yamanashi (JP)

(*) Notice: Subject to any disclaimer, the term of this patent is extended or adjusted under 35 U.S.C. 154(b) by 169 days.

(21) Appl. No.: 17/032,713

(22) Filed: Sep. 25, 2020

(65) Prior Publication Data

US 2021/0099056 A1 Apr. 1, 2021

(30) Foreign Application Priority Data

Sep. 30, 2019 (JP) .............................. JP2019-178717

(51) Int. Cl.
*H02K 11/21* (2016.01)
*H02K 1/18* (2006.01)

(52) U.S. Cl.
CPC ............. *H02K 11/21* (2016.01); *H02K 1/185* (2013.01)

(58) Field of Classification Search
CPC .................................. H02K 11/21; H02K 1/18
USPC .................................................. 310/68 B, 89
See application file for complete search history.

(56) References Cited

U.S. PATENT DOCUMENTS

| 7,550,881 | B1* | 6/2009 | Dietrich | H02K 1/187 |
| | | | | 310/91 |
| 2014/0300245 | A1* | 10/2014 | Ohashi | H02K 1/185 |
| | | | | 310/216.118 |
| 2018/0375405 | A1 | 12/2018 | Saito | |

FOREIGN PATENT DOCUMENTS

| DE | 202013006615 U | * | 7/2014 |
| JP | 2019-009885 A | | 1/2019 |
| JP | 2019-052677 A | | 4/2019 |

* cited by examiner

*Primary Examiner* — Jose A Gonzalez Quinones
(74) *Attorney, Agent, or Firm* — Robert P. Michal, Esq.; Carter, DeLuca & Farrell LLP

(57) ABSTRACT

A motor includes a sheet-like gasket for sealing the gap between a stator core and an encoder. The gasket has a structure including a metal plate and a sealing member covering the metal plate, and the gasket includes a first portion that is disposed at least between the end face on one end side of the stator core and the encoder and a second portion that has a structure including the sealing member with no metal plate and extends inward from the first portion to contact the projection.

5 Claims, 6 Drawing Sheets

MOTOR

CROSS-REFERENCE TO RELATED APPLICATION

This application is based upon and claims the benefit of priority from Japanese Patent Application No. 2019-178717 filed on Sep. 30, 2019, the contents of which are incorporated herein by reference.

BACKGROUND OF THE INVENTION

Field of the Invention

The present invention relates to a motor.

Description of the Related Art

Japanese Laid-Open Patent Publication No. 2019-009885 discloses a motor including a stator core (motor case), an encoder arranged on one end side of the stator core, and a sheet-shaped gasket (sealing member) that seals the gap between the stator core and the encoder.

The encoder has a housing (outer case), and the housing accommodates a detection element that detects the rotation angle of the rotation axis of a rotor and bearings that support the rotation axis of the rotor.

SUMMARY OF THE INVENTION

In regard to motors with an encoder, part of a bearing and so on in the encoder projects into the through hole of the stator core in which the rotor is arranged. That is, the encoder has a projection that protrudes into the through hole of the stator core. When a gap is formed between the projection and the stator core, there is concern that the projection will touch the stator core due to vibrations or other causes.

It is therefore an object of the present invention to provide a motor capable of suppressing a change in relative position between a stator core and an encoder.

One aspect of the present invention resides in a motor, comprising: a stator core configured to have a through hole in which a rotor is arranged; an encoder provided on a first end side of the stator core and configured to have a projection protruding into the through hole; and a sheet-like gasket configured to have a communication hole communicating with the through hole and seal the gap between the stator core and the encoder, wherein the gasket has a structure including a metal plate and a sealing member that covers the metal plate, and the gasket includes a first portion that is disposed at least between the end face on the first end side of the stator core and the encoder and a second portion that has a structure including the sealing member with no metal plate and extends inward from the first portion to contact the projection.

According to the aspect of the invention, provision of the gasket makes it possible to prevent a change in the relative position between the stator core and the encoder.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

The present invention will be detailed below by describing preferred embodiments with reference to the accompanying drawings.

Embodiment

Figure 1:
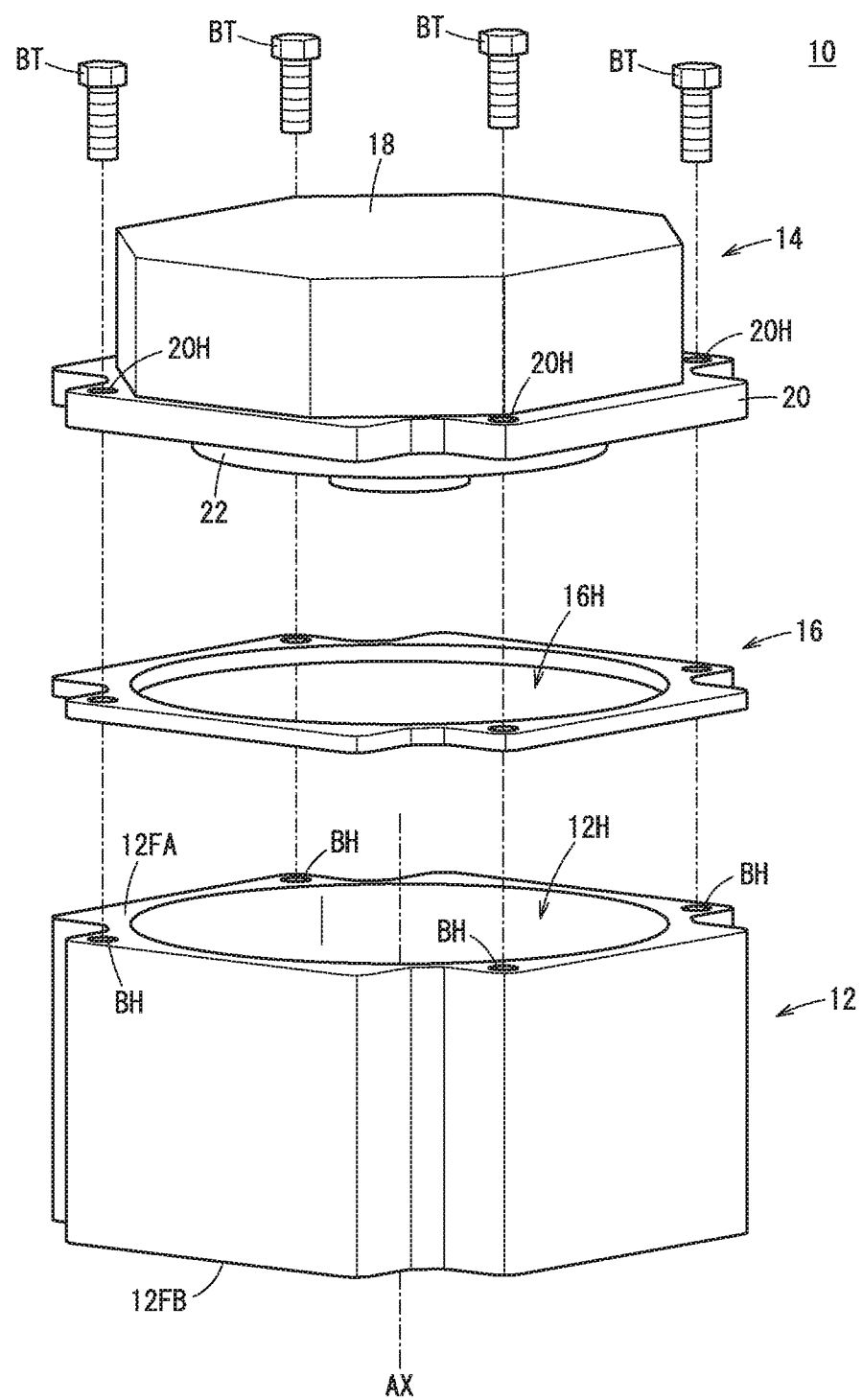
FIG. 1 is an exploded perspective view showing parts of a motor.

A motor 10 of an embodiment will be described with reference to FIG. 1. FIG. 1 is an exploded perspective view showing part of the motor 10. The motor 10 includes a stator core 12, an encoder 14 arranged on one end side of the stator core 12, and a gasket 16 that seals the gap between the stator core 12 and the encoder 14.

The stator core 12 has a through hole 12H in which the rotor is arranged and a plurality of bolt holes BH. The through hole 12H extends from an end face 12FA on one end side (which will be referred to as the first end side) of the stator core 12 to an end face 12FB on the other end side (which will be referred to as the second end side) of the stator core 12 along the central axis AX of the stator core 12. Each of the multiple bolt holes BH extends from the end face 12FA on the first end side of the stator core 12 toward the end face 12FB on the second end side of the stator core 12. The central axis AX of the stator core 12 coincides with the rotation shaft of the motor 10.

The encoder 14 includes a housing 18 in which a detection element for detecting the rotation angle of the rotation shaft of the rotor and bearings for supporting the rotation shaft of the rotor are accommodated. The housing 18 is formed with a plate-shaped flange 20 extending outward from the housing 18 along the end face 12FA of the stator core 12. The flange 20 has a plurality of bolt insertion holes 20H into which the bolt screws of the bolts BT fitted in the bolt holes BH of the stator core 12 can be inserted. The housing 18 is fixed to the end face 12FA side on the first end side of the stator core 12 by fitting the bolt screw of the bolt BT inserted into each of the multiple bolt insertion holes 20H in the bolt hole BH of the stator core 12.

The encoder 14 has a projection 22 that protrudes from the housing 18 to the outside of the housing 18. The projection 22 may include at least part of the bearings and the detection element housed in the housing 18. The projection 22 protrudes into the through hole 12H of the stator core 12 in a state where the housing 18 is fixed to the end face 12FA of the stator core 12. That is, in a state where the housing 18 is fixed to the end face 12FA of the stator core 12, the projection 22 enters into the through hole 12H beyond the opening surface of the through hole 12H on the first end side of the stator core 12.

Figure 2:
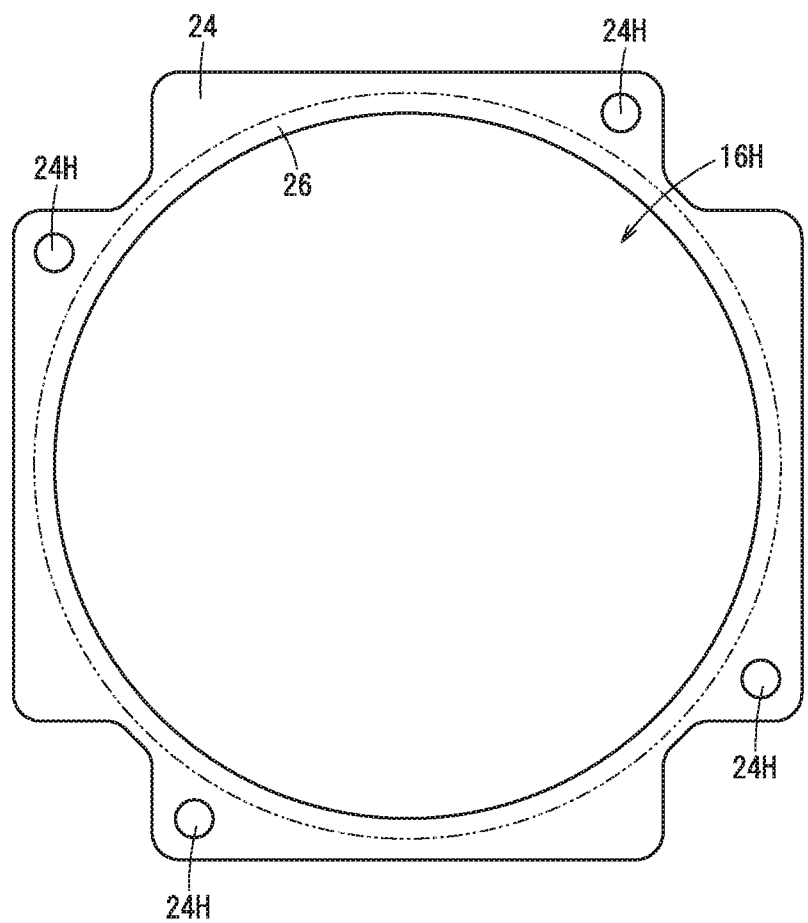
FIG. 2 is a diagram showing a gasket.

Referring next to FIG. 2, the gasket 16 will be described. FIG. 2 is a diagram showing the gasket 16. The gasket 16 is formed in a sheet shape and has a communication hole 16H that communicates with the through hole 12H of the stator core 12. In a state where the gasket 16 is arranged between the stator core 12 and the encoder 14, the communication hole 16H extends along the central axis AX (FIG. 1) of the stator core 12. The gasket 16 has a first portion 24 on the outer peripheral side and a second portion 26 on the inner peripheral side. The first portion 24 and the second portion 26 are connected without a gap. The first portion 24 has a plurality of bolt insertion holes 24H through which the bolt screws of the bolts BT can be inserted.

Figure 3:
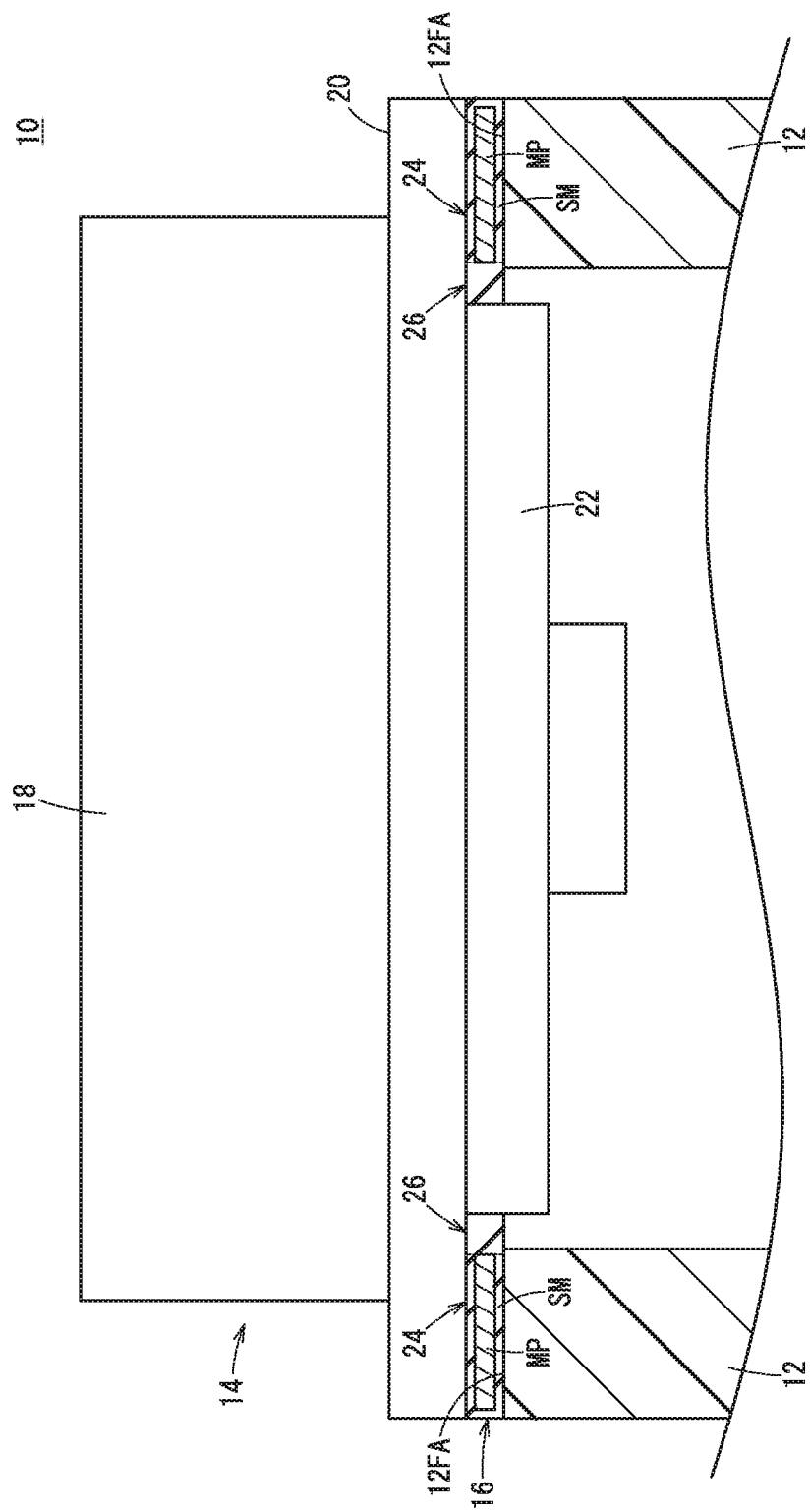
FIG. 3 is a sectional view of a peripheral motor including a gasket.

The gasket 16 will be described in more detail with reference to FIG. 3. FIG. 3 is a sectional view of a part of the motor 10 in the adjoining region of the gasket 16. In FIG. 3, only the gasket 16 and the stator core 12 are shown in a section cut along the central axis AX of the stator core 12 (the rotation shaft of the motor 10).

The first portion 24 has a structure including a metal plate MP and a sealing member SM that covers the metal plate MP. Examples of the sealing member SM include natural rubber, synthetic rubber, and others. The metal plate MP and the sealing member SM may be bonded with an adhesive. The surface of the sealing member SM may be coated with a film. The first portion 24 is arranged at least between the end face 12FA of the stator core 12 and the flange 20 of the encoder 14. The first portion 24 may marginally protrude inward from the end face 12FA of the stator core 12 (the through hole 12H side).

The second portion 26 has a structure including the sealing member SM with no metal plate MP, and extends inward from the first portion 24. That is, the second portion 26 is the part inside the inner end face of the metal plate MP (on the through hole 12H side of the stator core 12). The second portion 26 may be formed by extending the sealing member SM of the first portion 24 inward. Further, the surface of the sealing member SM of the second portion 26 may be coated with a film, as in the case of the first portion 24.

The second portion 26 extending inward from the first portion 24 is in contact with the projection 22 of the encoder 14. The second portion 26 may be in contact with the side surface of the projection 22 without a gap along the circumferential direction of the stator core 12, or there may be space around the side surface of the projection 22. In addition, the second portion 26 may contact and press the projection 22.

In the above way, the gasket 16 of the present embodiment includes the first portion 24 having the metal plate MP and the sealing member SM that covers the metal plate MP, and the second portion 26 extending inward from the first portion 24. The second portion 26 includes the sealing member SM with no metal plate MP and is in contact with the projection 22 of the encoder 14.

With this arrangement, the gasket 16 can prevent changes in the relative position between the stator core 12 and the encoder 14. It is therefore possible to prevent the projection 22 of the encoder 14 from contacting the stator core 12 due to vibrations and the like transmitted to the motor 10.

Further, when the projection 22 of the encoder 14 is attached to the rotation shaft of the rotor arranged in the through hole 12H of the stator core 12 with the gasket 16 attached to the end face 12FA of the stator core 12, the second portion 26 of the gasket 16 can support the projection 22. Therefore, when the motor 10 is assembled, the projection 22 can be prevented from dropping from a predetermined position to the rotor side.

Modification

The above embodiment may be modified as follows.
(Modification 1)

Figure 4:
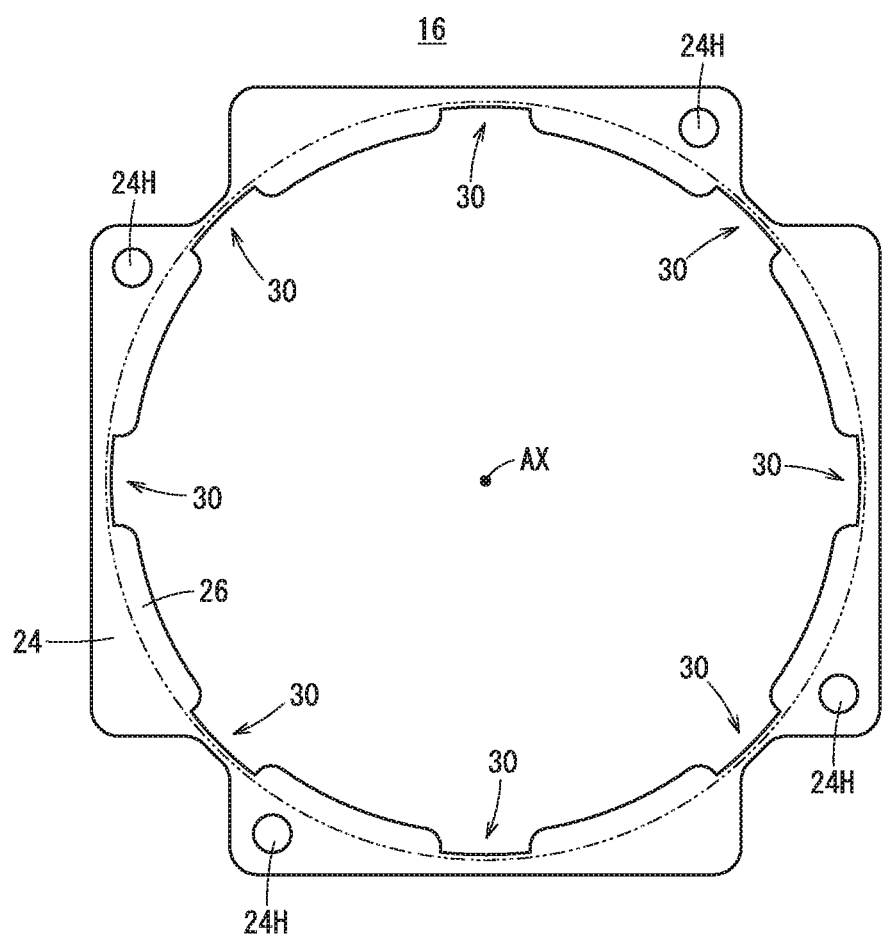
FIG. 4 is a diagram showing a gasket of a modification 1.

A modification 1 will be described with reference to FIG. 4. In this modification, the second portion 26 of the gasket 16 is formed with a plurality of notches 30 at intervals circumferentially around the central axis AX of the stator core 12. That is, the multiple notches 30 are provided in the second portion 26 at intervals along the circumferential direction of the stator core 12.

As a result, when the encoder 14 is attached to the rotation shaft of the rotor arranged in the through hole 12H of the stator core 12, the encoder 14 can be positioned so that the phase of the encoder 14 matches the phase of the rotor. It is hence possible to obtain the motor 10 that can appropriately detect the rotation angle.
(Modification 2)

Figure 5:
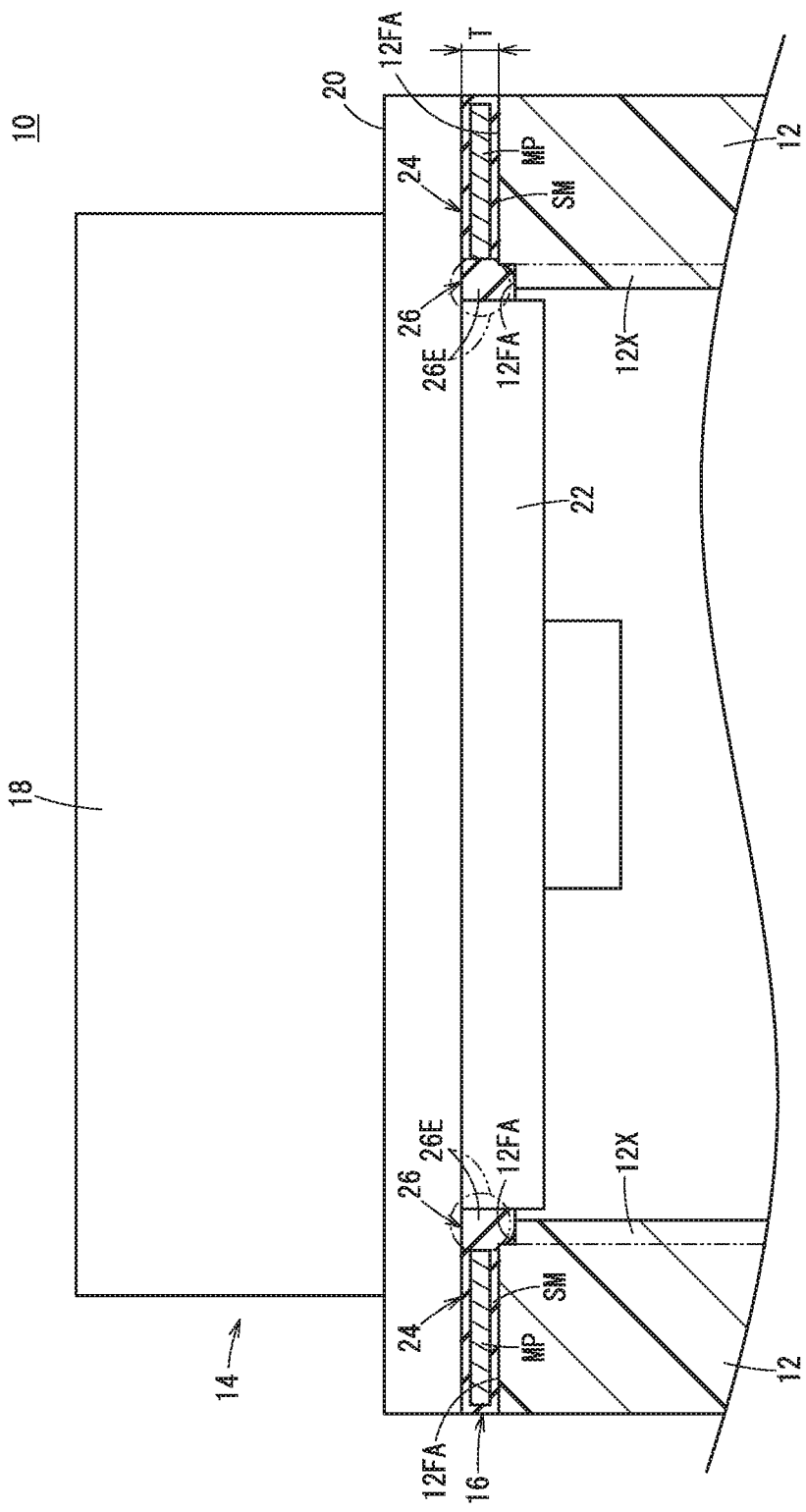
FIG. 5 is a diagram showing an encoder of a modification 2.

Referring to FIG. 5, a modification 2 will be described. When this modification is compared with the above embodiment, the shape of the stator core 12 is different. The second portion 26 of the gasket 16 has an end 26E the shape of which is different from the above embodiment.

The end 26E of the second portion 26 is elastic and located at an end of the central axis AX side of the stator core 12. The end 26E of the second portion 26 is formed so as to have a circular arc section with a diameter greater than the thickness T of the first portion 24, as indicated by the two-dot chain line in FIG. 5, in a state where the end 26E is not in contact with the projection 22 of the encoder 14, as viewed in a cross-section that is cut by a plane containing the central axis AX of the stator core 12. The thickness T of the first portion 24 is the dimension of the first portion 24 in the direction along the central axis AX of the stator core 12.

Here, the second portion 26 is also flexible. Thus, the end 26E of the second portion 26 is deformed as shown by the solid line in FIG. 5 in a state where the end 26E is in contact with the projection 22 of the encoder 14, whereby the section viewed in the cross-section cut by a plane containing the central axis AX of the stator core 12 does not have an arc outline.

In this modification, the end face 12FA on the first end side of the stator core 12 has a step. The lower part of the end face 12FA contacts a part of the end 26E of the second portion 26. This makes it possible to further prevent a change in the relative position between the stator core 12 and the encoder 14. In addition, the sealing performance of the gasket 16 for preventing water and dust from entering the interior is enhanced.

The step of the end face 12FA on the first end side of the stator core 12 is formed by providing the stator core 12 with a projected portion 12X that protrudes from the inner wall side of the stator core 12 toward the central axis AX of the stator core 12. The projected portion 12X may be provided fully along the inner wall surface that extends in the circumferential direction of the stator core 12, or may be provided partly along the inner wall surface. Further, the projected portion 12X may or may not extend to the end face 12FB (FIG. 1) on the second end side of the stator core 12.
(Modification 3)

Figure 6:
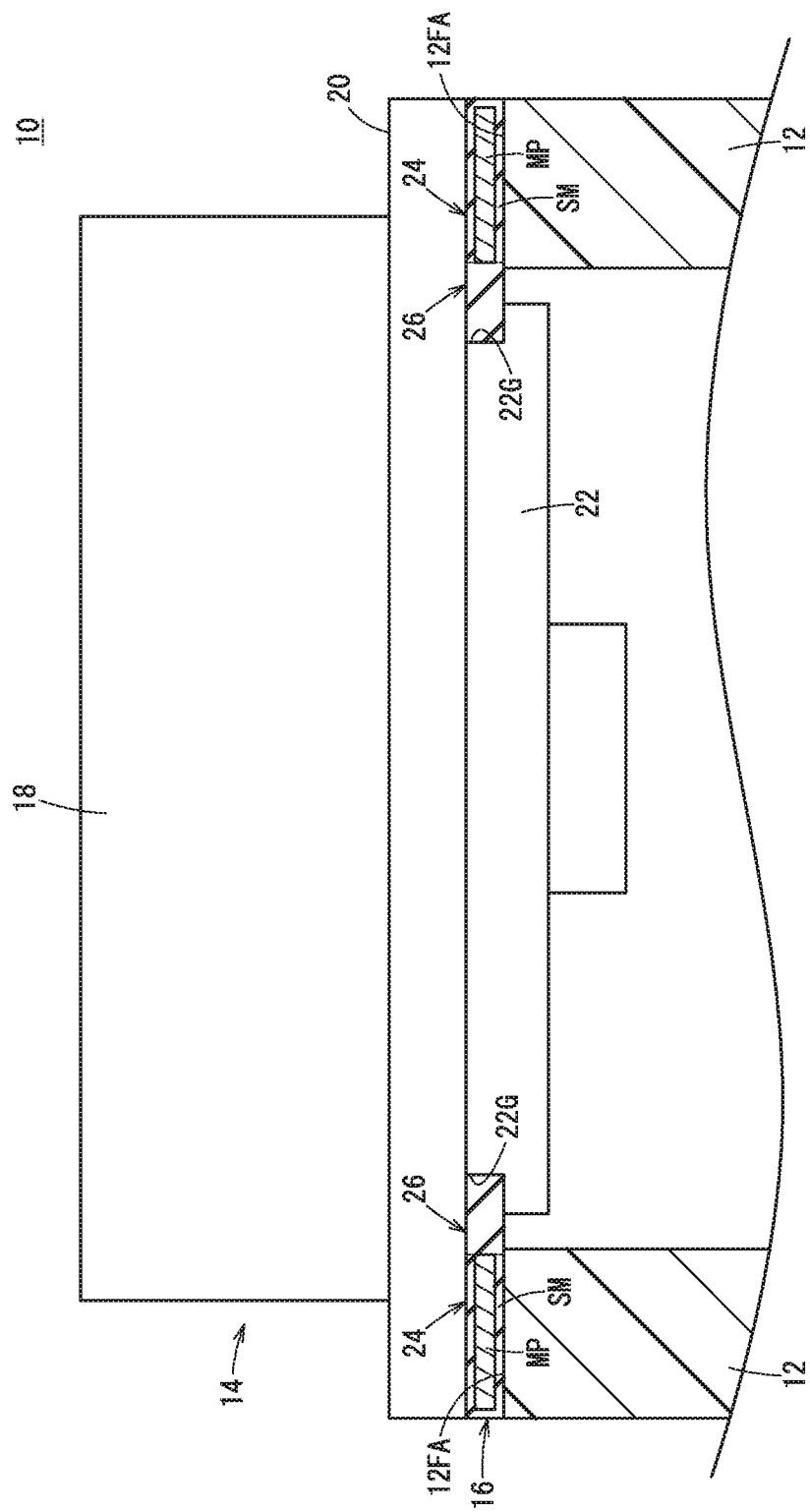
FIG. 6 is a diagram showing an encoder of a modification 3.

Referring to FIG. 6, a modification 3 will be described. In this modification, a groove 22G is formed in the projection 22 of the encoder 14. The groove 22G may be formed fully along the side surface of the projection 22 that extends in the circumferential direction of the stator core 12, or may be formed partly along the side surface of the projection 22. The tip of the second portion 26 of the encoder 14 enters the groove 22G. This tip may have the same form as that of the end 26E explained in the modification 2, having a circular arc shape in the cross-section cut by a plane containing the central axis AX of the stator core 12.

Thus, the projection 22 of the encoder 14 is formed with the groove 22G into which the tip of the second portion 26 of the encoder 14 is inserted, whereby it is possible to prevent a change in the relative position between the stator core 12 and the encoder 14.

(Modification 4)

The above-described embodiment and modifications may be arbitrarily combined as long as no technical inconsistencies occur.

Technical Ideas

The aspects of the invention will be described below as the technical ideas that can be grasped from the above embodiment and modifications.

The present invention is a motor (10), comprising: a stator core (12) configured to have a through hole (12H) in which a rotor is arranged; an encoder (14) provided on a first end side of the stator core (12) and configured to have a projection (22) protruding into the through hole (12H); and a sheet-like gasket (16) configured to have a communication hole (16H) communicating with the through hole (12H) and seal the gap between the stator core (12) and the encoder (14). The gasket (16) has a structure including a metal plate (MP) and a sealing member (SM) that covers the metal plate (MP), and the gasket includes a first portion (24) that is disposed at least between the end face (12FA) on the first end side of the stator core (12) and the encoder (14) and a second portion (26) that has a structure including the sealing member (SM) with no metal plate (MP) and extends inward from the first portion (24) to contact the projection (22).

Thus, the provision of the gasket (16) makes it possible to prevent a change in the relative position between the stator core (12) and the encoder (14).

The second portion (26) may be configured to be in contact with the side surface of the projection (22) without any gap along the circumferential direction of the stator core (12). This configuration makes it possible to further prevent a change in the relative position between the stator core (12) and the encoder (14).

The second portion (26) may be configured to have a plurality of notches (30) formed at intervals along the circumferential direction of the stator core (12). As a result, when the encoder (14) is attached to the rotation shaft of the rotor arranged in the through hole (12H) of the stator core (12), the encoder (14) can be positioned so that the phase of the encoder (14) matches the phase of the rotor. Accordingly, it is possible to obtain the motor (10) that can detect the rotation angle appropriately.

The second portion (26) may be configured to have an end (26E) formed so as to have a circular arc section having a diameter greater than the thickness (T) of the first portion (24) in a state where the end is not in contact with the projection (22), as viewed in a cross-section that is cut by a plane containing the central axis (AX) of the stator core (12), and the end face (12FA) on the first end side of the stator core (12) may be configured to have a step, and the lower part of the end face (12FA) contacts a part of the end (26E) of the second portion (26). This configuration makes it possible to further prevent a change in the relative position between the stator core (12) and the encoder (14) and also enhance the sealing performance of the gasket (16).

The projection (22) may be configured to have a groove (22G) into which the tip of the second portion (26) is inserted. This configuration makes it possible to further prevent a change in the relative position between the stator core (12) and the encoder (14).

The present invention is not limited to the above-described embodiment, and various modifications can be made without departing from the gist of the present invention.

What is claimed is:

1. A motor, comprising:
    a stator core configured to have a through hole in which a rotor is arranged;
    an encoder provided on a first end side of the stator core and configured to have a projection protruding into the through hole; and
    a sheet-like gasket configured to have a communication hole communicating with the through hole and seal a gap between the stator core and the encoder,
    wherein the gasket has a structure including a metal plate and a sealing member that covers the metal plate, and the gasket includes
        a first portion that is disposed at least between an end face on the first end side of the stator core and the encoder and
        a second portion that has a structure including the sealing member with no metal plate and extends inward from the first portion to contact the projection.

2. The motor according to claim 1, wherein the second portion is configured to be in contact with a side surface of the projection without any gap along a circumferential direction of the stator core.

3. The motor according to claim 1, wherein the second portion is configured to have a plurality of notches formed at intervals along a circumferential direction of the stator core.

4. The motor according to claim 1, wherein:
    the second portion is configured to have an end formed so as to have a circular arc section having a diameter greater than a thickness of the first portion in a state where the end is not in contact with the projection, as viewed in a cross-section that is cut by a plane containing a central axis of the stator core; and
    the end face on the first end side of the stator core is configured to have a step, and a lower part of the end face contacts a part of an end of the second portion.

5. The motor according to claim 1, wherein the projection is configured to have a groove into which a tip of the second portion is inserted.

* * * * *